HYBRID NETWORK UTILIZING PLURAL TWO-WINDING TRANSFORMERS AND RESISTIVE BALANCING MEANS
Filed Dec. 9, 1963 2 Sheets-Sheet 1

WITNESSES
Leon J. Fara
James F. Young

INVENTORS
George E. Petts, III and
Heber J. Morrison
BY Ernest P. Klipfel
ATTORNEY 3,296,557

HYBRID NETWORK UTILIZING PLURAL TWO-WINDING TRANSFORMERS AND RESISTIVE BALANCING MEANS

George E. Petts 3rd, Annapolis, and Heber J. Morrison, Ellicott City, Md., assignors to Westinghouse Electric Corporation, Pittsburgh, Pa., a corporation of Pennsylvania Filed Dec. 9, 1963, Ser. No. 329,052
2 Claims. (Cl. 333—11)

This invention relates to hybrid networks in general and in particular to a transformer hybrid network which is adaptable to provide any number of outputs from a single source of electrical energy.

A hybrid network is an electrical circuit in which passive circuit elements are connected together such that there is one input and a plurality of outputs, two or more which are isolated from each other by balancing. Balancing from one output to any other output is provided by providing an additional signal path between all of the outputs so that there is a reversed phase signal therethrough with respect to the signal from the common input.

Hybrid type networks are well known in the art particularly in telephony where a bridging transformer is used, for example, in coupling a two-way telephone circuit to a repeater station or for coupling two one-way circuits to a two-way circuit. The line is properly balanced by a balancing network so that there is no reaction between the output and input connections. In its simplest form, the bridging transformer consists of a two winding transformer with a center tapped secondary with one-half of the secondary providing one arm of a Wheatstone bridge circuit. By placing the loads in the opposite arms of the bridge, it is possible to obtain a balanced condition where there is no interaction between the loads.

It is an object of the present invention therefore to provide an improved hybrid transformer network which can provide any number of mutually isolated outputs.

It is another object of the present invention to provide a hybrid transformer network which has a relatively simple balancing network.

It is yet another object of the present invention to provide to multi-pole hybrid network which has one input and "N" outputs which are mutually isolated from one another.

Still another object of the present invention is to provide a hybrid network which can be used for purposes of combining a plurality of isolated signal sources to feed a common load.

Briefly, the subject invention provides a means whereby a plurality of transformers are coupled to a plurality of loads in a predetermined manner with a purely resistive balancing network coupled between each of the plurality of loads which network provides a reversed phase signal path thereby isolating all of the loads from each other regardless of their respective magnitudes. Conversely, the present invention provides a means whereby a common load can be fed from a plurality of mutually isolated signal sources.

Other objects and advantages will become apparent as a reading of the following specification proceeds when read in view of the following drawings, in which.

Figures 1, 2, 3:
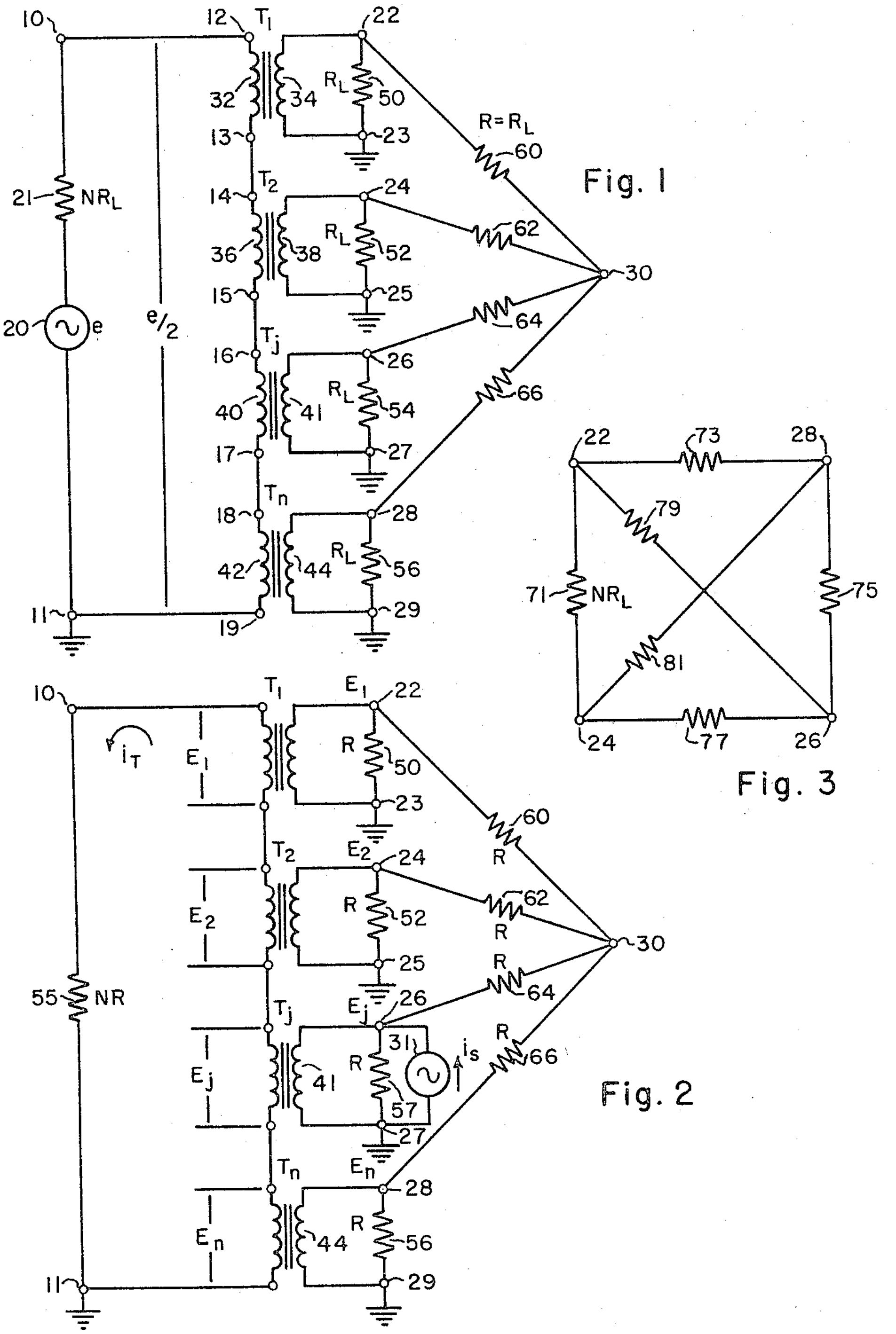
FIGURE 1 is a schematic diagram illustrative of a preferred embodiment of the subject invention.
FIG. 2 is a schematic diagram helpful in understanding the embodiment shown in FIG. 1.
FIG. 3 is a schematic diagram of a balancing network which can be used with the embodiment shown in FIG. 1.

Directing attention now to FIG. 1, there is shown a source of electrical signals 20 having an internal impedance 21 and output terminals 10 and 11. The internal impedance 21 of the signal source 20 is of a predetermined value $NR_L$ for reasons which will become more evident as the following description proceeds. The signal source 20 provides a voltage of a magnitude $e$ which, when a matched impedance is placed across terminals 10 and 11, will provide a signal $e/2$ thereacross. A plurality (N) of transformers $T_1$, $T_2$, . . . $T_j$, and $T_n$ are coupled to the output terminals 10 and 11 of the signal source 20 in the following manner. The primary windings 32, 36, 40 and 42 are coupled together in series such that terminal 12 of winding 32 is connected to terminal 10 of signal generator 20. Terminal 13 of winding 32 is connected to terminal 14 of primary winding 36; likewise, terminal 15 is connected to terminal 16 and terminal 17 is connected to terminal 18. The terminal 19 of transformer primary winding 42 is coupled to output terminal 11 which is likewise returned to a point of reference potential illustrated as and hereinafter referred to as ground. A load impedance 50 having a value $R_L$ is coupled across the secondary winding 34 of transformer $T_1$. The load 50 is shown connected to secondary terminals 22 and 23 with terminal 23 being connected to ground. A second load impedance 52 is connected across the secondary winding 38 of transformer $T_2$ by being connected to the terminals 24 and 25. A $j$th load 54 is connected across the secondary winding 41 of transformer $T_j$ at terminals 26 and 27 and an $n$th load 56 is connected to the secondary winding 44 of transformer $T_n$ at terminals 28 and 29. A balancing network comprising resistors 60, 62, 64 and 66 connected together in a star configuration, i.e., each resistor is coupled to a common terminal, is coupled to each of the loads 50 to 56. More particularly, resistor 60 has one terminal connected to secondary terminal 22. Resistor 62 has one end connected to terminal 24 and likewise resistors 64 and 66 have one end connected to terminals 26 and 28 respectively. The opposite ends of resistors 60 through 66 are connected together at a common terminal 30. The values of resistors 60 through 66 are substantially equal to each other and are preferably equal to the value of the load impedances 50 through 56 or $R_L$ for proper impedance match.

Assuming for purposes of illustration that each transformer $T_1$ through $T_n$ has a turns ratio $(N_1/N_2)$ of 1:1, an impedance $R_L$ is reflected into its respective primary winding and since the primary windings 32 through 42 are connected in series, a total load impedance of $NR_L$ appears across terminals 12 and 19 such that the signal source 20 looks into a load impedance of $NR_L$. Since the internal impedance 21 is predeterminedly chosen to be equal to $NR_L$ an impedance match is produced wherein the voltage appearing across output terminals 10 and 11 will be equal to $e/2$ at which condition maximum power transfer takes place between the signal source 20 and the loads 50 through 56. If another type of transformer is utilized where the turns ratio is other than a 1:1 relationship, the impedance reflected back into the primary winding is equal to $R_L \times (N_1/N_2)^2$, in which case the internal impedance 21 would be increased or decreased, as the case may be, by a factor of the square of the turns ratio of the transformers for an impedance match. It should be understood that it is not necessary to have an impedance match to practice the subject invention; however, it is usually desirable for maximum power transfer.

In operation, assuming the preferred condition, when the combined load appearing across terminals 10 and 11 is equal to the impedance of the source providing an impedance match, the power will be equally divided among the transformers $T_1$ through $T_n$ and consequently equally among the respective loads 50 through 56. Isolation between all of the loads is provided for by the balancing network are at the same potential, i.e., the voltage at ter- subsequently shown. All of the terminals of the balanced network are at the same potential, ie., the voltage at terminals 22, 24, 26 and 28 are substantially identical, and therefore no current flows in the balancing network and consequently no power is dissipated in the balance resistors 60, 62, 64 and 66. Since no power is dissipated in the balance resistors, all of the input power is transferred to the respective loads 50–56 while at the same time providing sufficient isolation between the loads that interaction between the loads 50–56 is prevented.

In order to show that the balance network comprising a star network such as utilized in the embodiment shown in FIG. 1 provides the required isolation between all of the loads, reference must be made to FIG. 2 wherein the signal source 20 of FIG. 1 is replaced by a load 55 equal to NR connected across terminals 10 and 11. The value of R is equal to the internal impedance 21 of FIG. 1 and N equals the number of transformers utilized.

Assuming again that transformers $T_1$ through $T_n$ have 1:1 turns ratios, a current generator comprising a signal source 31 shunted by an impedance 57 equal to the nominal load impedance $R_L$ is inserted across the secondary winding 41 of transformer $T_j$ at the terminals 26 and 27. The current generator injects a current $i_s$ into the secondary circuit of transformer $T_j$. Considering each terminal 22, 24, 26 and 28 coupled to the resistor balancing network as a pole or node of an N pole star network, circuit balance can be proven by the use of nodal equations of the network. Nodal equations are defined as the system of equations obtained by equating the incoming currents to the outgoing currents at each node or pole of the network according to Kirchoff's Laws of electrical energy. Considering that a current $i_s$ flows towards the pole at terminal 26 and that voltages $E_1$ to $E_n$ exist at all of the poles at terminals 22 to 28 respectively and that a voltage $E_c$ exists at the common terminal 30, the following equation can be written:

$$i_T=\left(\sum_{a=1}^{a=n}E_a\right)/NR \qquad (1)$$

where the current $i_T$ is equal to the sum of all of the pole voltages divided by the resistance NR in the loop comprising the series combination of the primary windings of transformers $T_1$–$T_n$ and the load impedance 55. The equation for the *j*th node is expressed as:

$$i_s=\frac{2E_j}{R}-\frac{E_c}{R}+i_T \qquad (2)$$

combining Equations 1 and 2

$$i_s=\frac{2E_j}{R}-\frac{E_c}{R}+\left(\sum_{a=1}^{a=n}E_a\right)/NR \qquad (3)$$

The nodal equation at terminal 30, the center of the star is:

$$O=-\frac{E_j}{R}+\frac{NE_c}{R}-\frac{1}{R}\left(\sum_{a=1}^{a=j-1}E_a\right)-\frac{1}{R}\left(\sum_{a=j+1}^{a=n}E_a\right) \qquad (4)$$

Dividing Equation 4 by N yields:

$$O=-\frac{E_j}{NR}+\frac{NE_c}{NR}-\frac{1}{NR}\left(\sum_{a=1}^{a=j-1}Ea+\sum_{a=j+1}^{a=n}E_a\right) \qquad (5)$$

Combining Equations 3 and 5

$$i_s=\frac{2E_j}{R}-\frac{E_c}{R}+\frac{E_c}{R}-\frac{E_j}{NR}+\frac{E_j}{NR} \qquad (6)$$

or, $$i_s=\frac{2E_j}{R} \qquad (7)$$

and $$E_j=i_sR/2 \qquad (8)$$

This illustrates that $E_j$ is independent of the voltages developed at the other terminals of the network. By reciprocity then, the voltages at the other terminals are independent of the voltage $E_j$ at terminal 26. Another way in which the balancing could be considered is that the current $i_s$ develops a voltage across the loads 50, 52 and 56 which is bucked or canceled by the voltage developed across the secondary windings 34, 38 and 44 resepctively due to the flow of current $i_T$ in the primary circuit so that the magnitude of the voltages at terminals 22, 24 and 28 is equal to zero. This being the case, no current will flow in the load resistors 50, 52, 54 and 56.

While an N pole star balancing network is preferred, it should be understood that the N pole star network can be replaced by an N pole delta network as shown in FIG. 3 by making the known circuit conversion from a star to a delta network. Considering FIG. 3, the secondary terminals 22, 24, 26 and 28 are interconnected by a balance resistor between all possible pairs of terminals. More particularly, resistor 71 is connected between terminals 22 and 24, resistor 77 is connected between terminals 24 and 26, resistor 75 is connected between terminals 26 and 28, and resistor 73 is connected between terminals 28 and 22. Additionally, resistor 81 and resistor 79 cross-couple terminals 24 and 28, and terminals 22 and 26, respectively. Whereas the value of the resistor for the N pole star balancing network was preferably equal to the value of the load impedance, the transformation into an equivalent N pole delta balancing network requires the value of each resistor 70–81 be equal to NR for proper balance. In the N pole delta balancing network, a balance resistor must be connected between all possible points or poles which means that for "N" outputs, $N\times(N-1)/2$ balance resistors are required. For example, if "N" equals 100, approximately 5,000 balance resistors are required. By utilizing the N pole star balancing network, only one balance resistor is required for each pole of the network resulting in a considerable simplification. Hence, the N pole star network is the preferred embodiment. Additionally, it can be shown by an analysis similar to that undertaken with respect to FIG. 2 that utilizing a balance resistor equal to NR for the N pole delta balancing network, proper balance is achieved to provide the required isolation between the loads 50 through 56 of FIG. 1.

Figure 4:
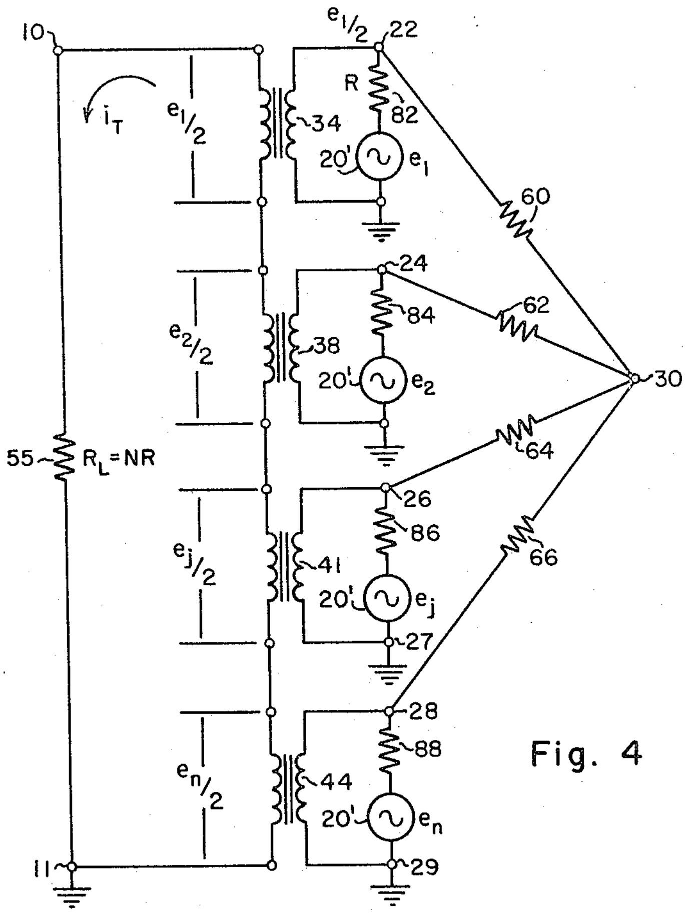
FIG. 4 is a schematic diagram of an embodiment of the subject invention wherein a plurality of signal sources are adapted to feed a single load.
Figure 5:
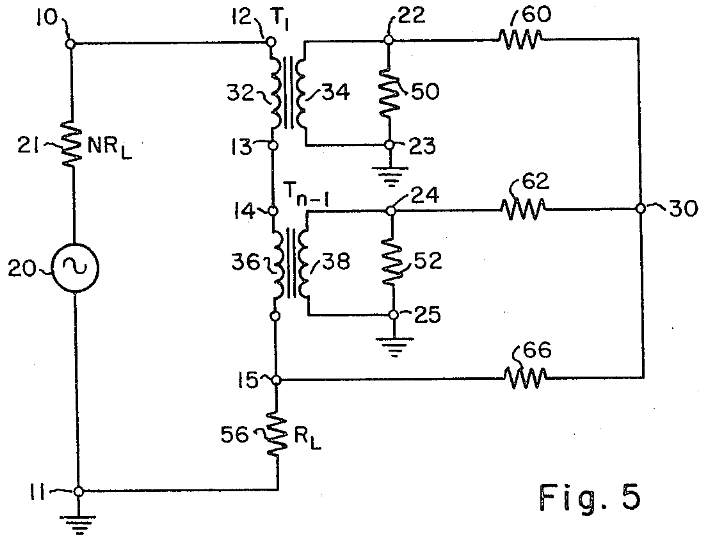
FIG. 5 is a schematic diagram of another embodiment of the subject invention.

FIG. 4 illustrates the manner in which a plurality of signal sources could be coupled to a single load by utilizing the teachings of the subject invention. In the embodiment shown in FIG. 4, the respective load impedances of FIG. 1, connected across the secondary windings of the transformers $T_1$ through $T_n$ are replaced by voltage sources 20' and the signal source 20 of FIG. 1 is replaced by a single load 55. In greater detail, the voltage source 20' having an internal impedance 82 is connected across terminals 22 and 23 of secondary winding 34. Similarly, signal sources 20' are connected across respective secondary windings 38, 41 and 44. An N pole star balancing network comprising resistors 60, 62, 64 and 66 of substantially equal value are connected to the transformers $T_1$ through $T_n$ at terminals 22, 24, the *n*th balance resistor 66 is connected to the common connection of the primary winding of $T_{n-1}$ transformer $T_2$ (in the case of 3 loads) and the load 56 at junction 15. In all other respects the circuit is identical to that of FIG. 1. In operation it is substantially the same as the embodiment shown in FIG. 1.

In summation, the present invention comprises an all transformer hybrid network which feeds any desirable number of outputs which are simultaneously isolated from one another simply by means of a balancing network comprised solely of resistors.

While there has been shown and described what is at present considered to be the preferred embodiment of the invention, modifications will readily occur to those skilled in the art. For example, transformers with different turns ratios may be used when desired as well as loads of different magnitudes. It is not desired, therefore, that the invention be limited to those specific arrangements shown and described, but it is to be understood that all equivalents, alterations, and modifications within the spirit and scope of the present invention are herein meant to be included.

We claim as our invention:

1. A transformer hybrid network providing N outputs comprising in combination; an N number of transformers each including a primary and a secondary winding of predetermined turns ratio disposed on its own core; an N number of loads, each load coupled across a respective secondary winding of said plurality of transformers; means for returning one terminal of said secondary winding to a point of reference potential; a balancing network comprising an N pole star network of resistors coupled together at a common terminal with the other terminal of each resistor coupled to a respective load of said N number of loads; circuit means for connecting each said primary winding of said plurality of transformers together in series circuit relationship; a source of electrical power having an internal source impedance substantially equal to the product of said load impedance times the number of said primary windings connected in series times the square of said turns ratio of said transformers; means for coupling said series circuit relationship across said source of electrical power; and circuit means for returning one side of said source of electrical power to the point of reference potential.

2. An electrical circuit for coupling a plurality of electrical power sources to a load comprising in combination; a plurality of transformers, each having its own magnetic core and a primary and a secondary winding inductively disposed thereon; means for coupling each said primary winding together in series circuit relationship across said load; means for coupling one of said plurality of electrical power sources across each said secondary winding of said plurality of transformers; and an N pole balancing network comprising a plurality of resistors coupled to each of said plurailty of sources, including means for interconnecting all said resistors to a common terminal, for providing isolation between each said plurality of electrical power sources; circuit means coupled to said load for returning it to a point of reference potential; and circuit means for returning one side of each of said plurality of electrical power sources to said point of reference potential.

References Cited by the Examiner

UNITED STATES PATENTS

| | | | |
|---|---|---|---|
| 2,333,148 | 11/1943 | Botsford | 333—11 |
| 3,091,743 | 5/1963 | Wilkinson | 333—11 |
| 3,181,087 | 4/1965 | Almering | 333—11 |

FOREIGN PATENTS

| | | |
|---|---|---|
| 555,473 | 8/1943 | Great Britain. |

OTHER REFERENCES

"Radiotron Designer's Handbook," Langford-Smith, RCA Victor Division, Radio Corporation of America, N.J., 1952, pp. 199–203.

HERMAN KARL SAALBACH, *Primary Examiner.*

A. R. MORGANSTERN, M. NUSSBAUM, *Assistant Examiners.*